United States Patent [19]
Watase et al.

[11] Patent Number: 4,471,109
[45] Date of Patent: Sep. 11, 1984

[54] POLYESTER POWDERED PAINT

[76] Inventors: Hideo Watase, 3-19-2 Tamadaira, Hino-shi, Tokyo; Senkichi Nakakoshi, 7-403 Sakurajosui 1-1, Setagaya-ku, Tokyo, both of Japan

[21] Appl. No.: 561,741

[22] Filed: Dec. 15, 1983

[51] Int. Cl.$^3$ ...................... C08G 63/02; C08G 63/70
[52] U.S. Cl. .................................... 528/272; 525/418; 528/308.1; 528/308.2
[58] Field of Search .................. 528/272, 308.1, 308.2

[56] References Cited

U.S. PATENT DOCUMENTS

| | | | |
|---|---|---|---|
| 3,627,733 | 12/1971 | Ioka et al. | 528/308.1 X |
| 3,923,726 | 12/1975 | Benz | 525/177 |
| 4,374,949 | 2/1983 | Massey et al. | 524/720 |
| 4,403,090 | 9/1983 | Smith | 528/272 |

*Primary Examiner*—Lucille M. Phynes
*Attorney, Agent, or Firm*—Pearne, Gordon, Sessions, McCoy, Granger & Tilberry

[57] ABSTRACT

A polyester polymer powdered paint comprising a thermoplastic polyethylene iso-terephthalate copolymer containing from 8 to 20 mol % of isophthalic acid component and having an intrinsic viscosity of from 0.7 to 1.0.

4 Claims, No Drawings

POLYESTER POWDERED PAINT

FIELD OF THE INVENTION

The present invention relates to a polyester powdered paint and, more particularly the present invention relates to a powdered paint comprising a thermoplastic crystalline polyethylene iso-terephthalate copolymer having a specified intrinsic viscosity and a specified composition. An object of the present invention is to provide a high-performance powdered paint whose coating film is not damaged even when products coated therewith are subjected to after-processing such as bending.

BACKGROUND ART

It is well known to coat a metallic surface with a polymer powder. For this purpose, various resin powder are widely used. Heretofore, as polyester powdered paints, amorphous polymer powder obtained by copolymerizing various acids or diols with polyethylene terephthalate has been used in order to coat the metallic surface. With regard to crystalline polyester polymers, resins per se are superior in various characteristics to the amorphous polymers. However, they have been considered to be quite unsuitable as powder paints from the viewpoint of adhesiveness to the metallic surface. Since conventional polyester powdered paints are amorphous polymers having a high second-order transition point, they are locking in extensibility. Thus, when coated metal goods such as metal pipes are subjected to after-processing such as bending, coating films are immediately cracked. There have not been known powdered paints including polyester powdered paints providing a coating film which could not be damaged even when subjected to a processing such as bending or pressing.

Study has long been made to obtain a high-performance powdered paint giving a coating film which is not damaged even when subjected to a processing such as bending.

We have now found that when high-molecular powder composed of a specified crystalline polyester is used, there can be obtained a high-performance coating film which has good adhesiveness to a metallic surface and can withstand after-processing such as bending.

DISCLOSURE OF THE INVENTION

According to one aspect the invention consists in a polyester polymer powdered paint comprising a thermoplastic polyethylene iso-terephthalate copolymer containing from 8 to 20 mol % of isophthalic acid component and having an intrinsic viscosity of from 0.7 to 1.0.

By way of example only, additives such as pigment, dye, etc. may be mixed with the polymer before or after grinding. A metallic surface can be coated with the resulting powdered material by any of conventional methods such as fluidized bed dip coating or electrostatic powder coating. Preferably, the metallic surface is abraded to keep it clean, and then coating is conducted. The polymer exhibits excellent adhesion to the metallic surface without treating it with a primer. But, if desired, the metallic surface may be previously treated with a primer. In order to weld the polymer to the metallic surface in the coating treatment, it is necessary to heat the metallic surface at a temperature of from 260° to 400° C.

The powdered paint of the present invention has excellent adhesiveness and gives enamel-like fine finish and a high-performance coating film which has a hard surface having a high transition point of from 60° to 65° C., is excellent in resistance to weather and corrosion and electrical characteristics and further it can be subjected to after-processing such as bending or pressing.

The following examples further illustrate the present invention.

EXAMPLE 1

0.05% by weight of a green dye was mixed with a polyethylene iso-terephthalate polymer powder having an average particle size of 60 μ, containing 10 mol. % of copolymerized isophthalic acid component and having an intrinsic viscosity of 0.91. The mixture was thoroughly stirred, and introduced into the upper chamber of a fluidized bed. The fluidized bed was formed within a tank-shaped container which was divided into two compartments consisting of an upper chamber and a lower chamber by a perforated plate. The container was designed so that air was introduced from the lower chamber thereinto.

Air was introduced into the lower chamber and passed through the perforated plate into the powder layer of the upper chamber by means of a blower. The powder layer was expanded, while supported by air, to form a fluidized bed, whereby a material to be coated could be dipped without any resistance. A pipe (having a diameter of 15.9 mm, a thickness of 1 mm and a length of 200 mm; provided with a small hole at its one end so that it could be suspended by means of a wire) was previously heated at about 350° C. by means of a heating oven, removed therefrom and inserted into the fluidized bed. When the powder was brought into contact with the pipe, the powder was molten and adhered to the pipe. After 5 seconds, the pipe was removed. The resulting coating film flowed by thermal inertia and smoothed. Then the pipe was cooled with water to give a film of about 100 μ in thickness, said film being in an amorphous state. No pinholes were observed. The film on both outer and inner surfaces was uniform, and was neither cracked nor peeled even when the pipe was bent or broken.

EXAMPLE 2

The same material as that of Example 1 was introduced into an electrostatic spray coating apparatus. In this apparatus, the powder was electrically charged in such a manner that the polarity of the charged powder was made opposite to that of a material to be coated. The apparatus was provided with a powder gun. The powder was sprayed on the material to be coated by the action of air. The powder was electrically charged so that the powder was accumulated on the surface of the material to be coated by electrical attraction.

A zinc-plated pipe having a diameter of 76.3 mm, a length of 3 mm and a wall thickness of 3.6 mm, was rotatably supported by means of a jig. The powder material was sprayed on the pipe by means of the gun of the electrostatic spray coating apparatus. During spraying, the pipe was rotated so that the surface thereof was uniformly covered with the powder. Immediately after the completion of the spraying, the pipe was suspended within a furnace kept at 450° C. After three minutes, the pipe was removed. After the smoothness of the surface was confirmed, the pipe was cooled with water to give a film of about 80 μ in thickness, said film being in an amorphous state. No pinholes were observed. The resulting fine green, translucent film was excellent in adhesion, and not peeled off even when the pipe was subjected to a drilling operation.

The powder was classified to obtain particles having an average particle size of 30 μ or below. In a similar manner to that mentioned above, the particles were sprayed. After baking, the pipe was cooled by water to give film of about 40 μ in thickness. No pinholes were observed.

In conventional powder coating techniques, it was impossible to obtain a film free of any pinholes when the thickness of the film was 120 μ or below.

It is clear that the products of the present invention are also excellent in this respect.

We claim:

1. A polyester polymer powdered paint comprising a thermoplastic polyethylene iso-terephthalate copolymer containing from 8 to 20 mol % of isophthalic acid component and having an intrinsic viscosity of from 0.7 to 1.0.

2. A composition according to claim 1 having an average particle size of less than 60 μ.

3. A composition according to claim 1 or claim 2 when applied to a metallic surface heated to a temperature of from 260° C. to 450° C.

4. A composition according to claim 2 wherein the average particle size is 30 μ or below.

* * * * *